Sept. 27, 1932.  V. J. BUTTERFIELD  1,879,072
HEATING APPARATUS FOR AUTOMOTIVE VEHICLES
Filed Feb. 20, 1929  2 Sheets-Sheet 1
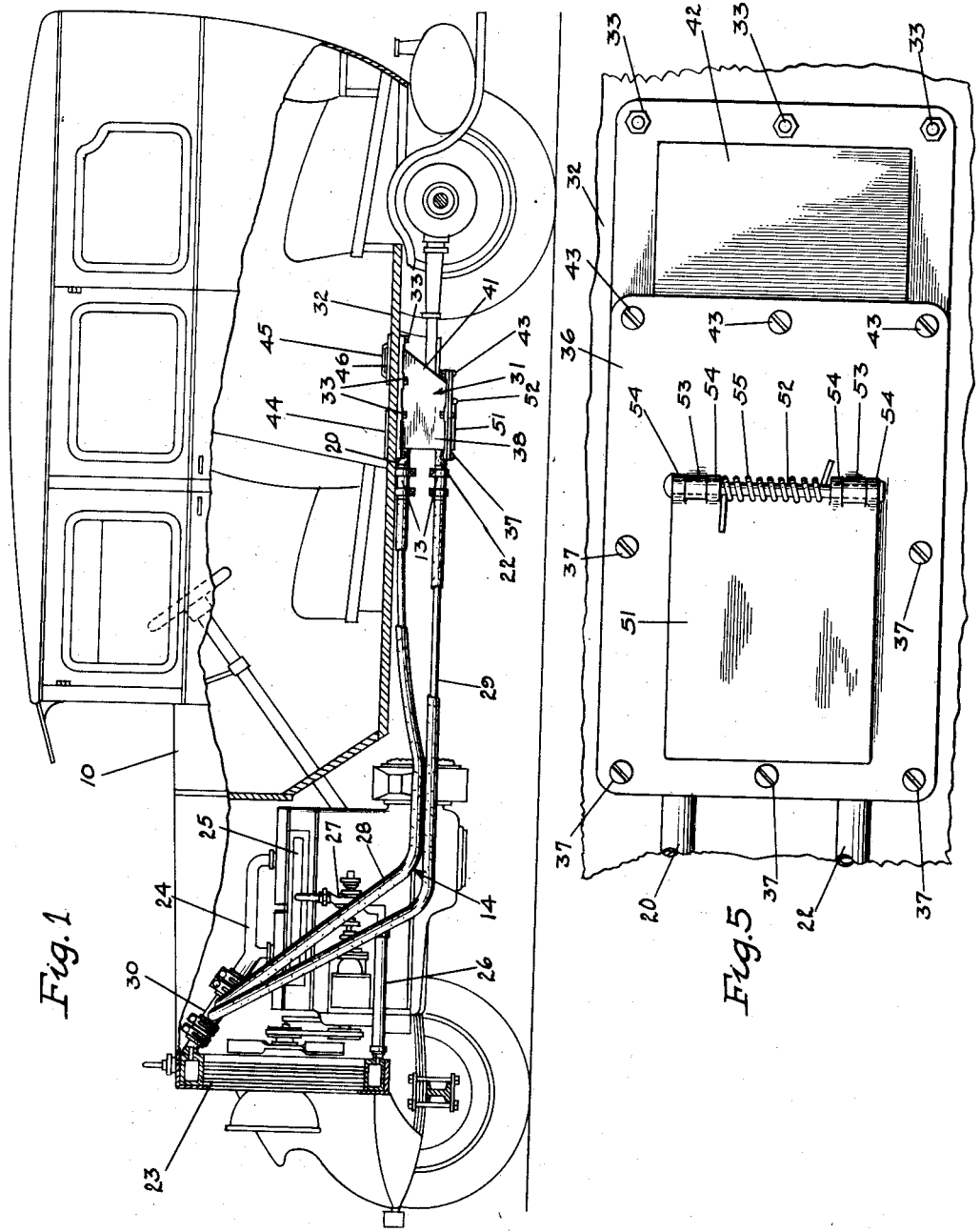
INVENTOR
VERNON J. BUTTERFIELD
By
ATTORNEYS Sept. 27, 1932.  V. J. BUTTERFIELD  1,879,072
HEATING APPARATUS FOR AUTOMOTIVE VEHICLES
Filed Feb. 20, 1929  2 Sheets-Sheet 2
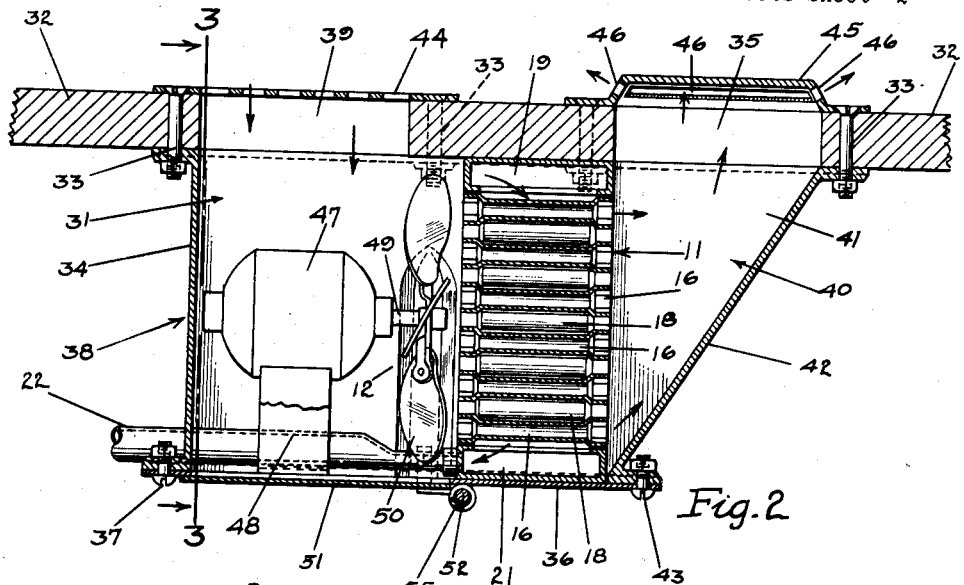
INVENTOR
VERNON J. BUTTERFIELD
ATTORNEYS Patented Sept. 27, 1932

1,879,072

UNITED STATES PATENT OFFICE

VERNON J. BUTTERFIELD, OF MINNEAPOLIS, MINNESOTA, ASSIGNOR TO TROPIC-AIRE, INCORPORATED, OF MINNEAPOLIS, MINNESOTA, A CORPORATION OF DELAWARE

HEATING APPARATUS FOR AUTOMOTIVE VEHICLES

Application filed February 20, 1929. Serial No. 341,401.

This invention relates to an apparatus for heating automotive vehicles, and has more particular reference to a heater designed to be positioned outside of a vehicle body, as for example, beneath the floor of a taxicab or other passenger vehicle, and adapted to withdraw air from the interior of the vehicle body, to heat said air, and to return the heated air to the vehicle body interior, to thus provide continuously circulated warm air within the vehicle body.

An object of the invention is to provide an automotive vehicle heater which will include a heating element, more especially adapted to be situated beneath the floor of a vehicle body, as for example, beneath the floor of the rear compartment of a taxicab or other passenger vehicle, having a plurality of air-circulating passages associated with water-circulating passages of the usual water-circulating system of the vehicle engine, and means associated with the heating element for withdrawing air from the interior of the vehicle body, for causing the withdrawn air to travel through the air-circulating passages of the heating element; and for returning the withdrawn and heated air back into the vehicle body interior, to thus cause said air to be continuously heated and kept in circulation within the vehicle body.

A further object is to provide a heating apparatus for an automotive vehicle, including a heating element disposed beneath and supported from the vehicle floor, an air withdrawing and returning means associated with the heating element, and also disposed beneath and supported from the vehicle floor, and an operative association of the heating element and the air withdrawing and returning means with each other and with the air-heating water-circulating system of the vehicle engine and the floor of the vehicle, each and all having novel and improved features and characteristics of construction as now to be fully described, it being understood that the disclosure herein is merely illustrative and intended in no way in a limiting sense, changes in details of construction and arrangement of parts being permissible so long as within the scope of the claims which follow.

In the accompanying drawings forming a part of this specification,

Fig. 1 is a side elevational view, partially sectioned and partially broken away, of an automotive vehicle, disclosing a heating apparatus, made in accordance with the present invention, associated with said vehicle;

Fig. 2 is an enlarged vertical, longitudinal sectional view of the heating element and the air withdrawing and returning means of the apparatus, as on line 2—2 in Fig. 3, also disclosing the vehicle floor and the register plates therein in section, and a connection between the heating element and the vehicle engine water-circulating system in side elevation;

Fig. 3 is an enlarged vertical, transverse sectional view of the heating element and its associated parts, as on line 3—3 in Fig. 2, a part of the heating element being broken away;

Fig. 4 is an enlarged top plan view of a fragment of the vehicle floor, disclosing the air-inlet and air-outlet register plates of the apparatus in elevation; and Fig. 5 is an enlarged bottom plan view of a fragment of the vehicle floor, disclosing, from the underside the hot air outlet leading from the air withdrawing and returning means and the heating element and communicating with the interior of the vehicle body, and the supporting and enclosing structure for the motor, the air propeller and the heating element of the apparatus.

With respect to the drawings and the numerals of reference thereon, 10 denotes an automotive vehicle equipped with a heating apparatus consisting, generally, of a heating element 11, disclosed as situated beneath the vehicle floor and supported therefrom, means 12 associated with the heating element, also disclosed as situated beneath and supported from the vehicle floor, for withdrawing air from the interior of the body of the vehicle and for causing the withdrawn air to be forcibly circulated through the heating element and returned to the vehicle body interior, and connections 14 between the heating element and the water-circulating system of the vehicle engine. As shown in Fig. 1, the heating element 11 is situated beneath the front portion of the floor of the rear compartment or tonneau of the vehicle, adjacent the front seat. Clearly, the heating element could be otherwise situated, as, for example, beneath the floor at the rear of the rear compartment or tonneau, adjacent the rear seat, or beneath the floor of the front compartment of the vehicle.

The heating element 11 includes a casing 15 housing horizontally disposed, air-circulating tubes or passages 16 having their opposite ends connected together to provide water-tight joints, as shown at 17 in Fig. 3, and said air-circulating tubes or passages 16 are spaced apart to provide water-circulating passages 18 therebetween. A water chamber 19 at the top of the casing 15, above the uppermost tubes or passages 16, is communicated with by an inlet pipe 20 and communicates with the water-circulating passages 18, and a water-chamber 21 at the bottom of said casing, below the lowermost tubes or passages 16, is communicated with by the water-circulating passages 18 and communicates with an outlet pipe 22. The opposite ends of all of the walls of the casing 15 are suitably sealed against the outermost tubes or passages 16 to render the casing water-tight. See Fig. 3.

Tubes 16 constructed and arranged as above described provide unobstructed air-circulating passages through the heating element, and provision is made for causing hot water to flow through said heating element, via the inlet pipe 20, the water chamber 19, the water-circulating passages 18, the water chamber 21, and the outlet pipe 22, so that air upon passing through the air-circulating tubes or passages 16 will become heated.

Numeral 23 represents the water-cooling radiator of the vehicle engine, 24 denotes a connection between the water-jacket 25 of said engine and said radiator, 26 designates a connection between the radiator and the water-jacket, and 27 indicates a pump in the connection 26 for forcing a flow of cooling-water through the water-circulating system of the engine, from the upper portion of the water-jacket through the connection 24 to the radiator and from the radiator through the connection 26 and pump 27 back to the water-jacket, in the usual manner. A connection 28 leads from the connection 24 to the intake pipe 20, and a connection 29 leads from the outlet pipe 22 back to the connection 24. A fitting 30 in the connection 24, receiving the adjacent ends of the connections 28 and 29, is adapted to contain a by-pass valve (not shown) capable of being adjusted to cause all, a part, or none of the water of the water-circulating system to pass through the water-circulating passages of the heating element, as may at some particular time be desirable. Any other preferred arrangement for causing water of the vehicle engine circulating system to flow through the water-circulating passages of the heating element can be substituted for the arrangement illustrated and described.

An enclosing structure for the heating element casing 15 may consist of spaced apart side members 31 fitted against and secured to the lower surface of the vehicle floor 32 as at 33, an end member 34 which may be integral with the side members 31, fitted against the said lower surface of the vehicle floor, and a bottom support 36 fitted against and secured to the side members 31 and the end member 34 as at 37. As disclosed, the heating element casing is fitted between the said lower surface of the vehicle floor and the bottom support and between the side members 31 to be stationarily situated in the enclosing structure, and said enclosing structure includes an air-receiving housing 38, for the air withdrawing and returning means 12, situated below an opening 39 in the vehicle floor 32 and communicating with the adjacent open ends of the air-circulating tubes or passages 16. A hot air outlet 40, leading from the air withdrawing and returning means 12 and the air-circulating tubes 16 and communicating with the interior of the vehicle body through an opening 35 in the vehicle floor, may consist of continuations 41 of the side members 31 and an oblique end member 42, which may be integral with said side walls 31, fitted against the lower surface of the vehicle floor and fitted against and secured to the bottom support 36 as at 43. Numeral 44 designates an air inlet register plate over the opening 39, and 45 indicates an air outlet register plate over the opening 35, the said register plate 45 having slots 46 about its margin adapted to obliquely deflect the air as it enters the vehicle body interior from the hot air outlet 40.

A motor 47, secured upon a bracket 48 in the housing 38 and resting upon the bottom support 36, has a shaft 49 which carries a fan 50 also situated in the housing and adapted to withdraw air from the interior of the vehicle body through the opening 39 in the vehicle floor 32, and to cause said air to travel through the air-tubes or passages 16, the hot air outlet 40, and the opening 35 in said vehicle floor, back to the vehicle body interior. As disclosed more clearly in Fig. 3, the side walls 31 of the enclosing structure for the heating element are offset outwardly to allow clearance for the fan 50.

While I have preferred to disclose the motor 47 as an electric motor, any other suitable type of motor could be substituted, and while the motor is disclosed as situated within the housing 38, it will be apparent that the motor could be differently situated, as for example, outside of the housing altogether, or within the heating element itself, provided several of the air-circulating tubes 16 were first removed to provide room for said motor.

A trap door 51, in the bottom support 36 and directly beneath the opening 44, is for the purpose of allowing the removal of dirt which may fall into the housing 38 through the open type register plate 44. A hinge for the door 51 includes a pin 52 mounted in ears 53 and 54 upon the bottom support and the door, respectively. A coil spring 55 upon said pin, having its opposite ends in engagement with the door and the bottom plate respectively, is adapted to normally urge the door to closed position. When it is desired to remove dirt from the housing 38, all that is necessary is to insert a suitable tool, as, for example, a screw driver, through the openings in the register plate 44 and cause said tool to push the door open against the action of the coil spring, as will be understood.

Adjustment of the by-pass valve in the fitting 30 can be made to regulate the amount of hot water allowed to flow through the heating element when the pump 27 is operating, and adjustment of the speed of rotation of the fan 50 can be made to regulate the amount of air withdrawn from the vehicle body interior, caused to be passed through the air-circulating tubes 16 and thus heated, and returned to the interior of the vehicle body through the hot air outlet 40. Evidently, when the fan 50 is in operation, air is caused to continuously travel through the air-circulating tubes or passages 16 to be thus heated, and the heated air is continuously circulated within the vehicle body. When the by-pass valve in the fitting 30 is adjusted to allow no hot water to traverse the heating element, the fan 50 can keep the air within the vehicle body in circulation without heating said air. The rate of circulation of air through the heating element and its air-circulating tubes 16 determines the rate at which the air being circulated absorbs heat from the hot water flowing through the heating element. When the fan 50 is put out of operation while the pump 27 is operating to force water through the heating element, but a small amount of heat will be dissipated to the interior of the vehicle body from the heating element.

I claim as my invention:

1. In an automotive vehicle, a heating element situated beneath the floor of said vehicle and having a plurality of air passages, an enlcosing structure for said heating element supporting the same from the vehicle floor, an air propeller housed by said enclosing structure and situated below an opening in the vehicle floor to communicate with one end of each of said air passages, and an air conduit connecting the opposite end of each of said air passages with the interior of said vehicle body through a different opening in said vehicle floor, the said air propeller being adapted to withdraw air from the vehicle body interior through one of said floor openings, to cause the withdrawn air to travel through the air passages of said heating element, and to return the withdrawn and heated air to the interior of said vehicle body through the other of said floor openings.

2. In an automotive vehicle, of a heating element situated beneath the floor of said vehicle and having a plurality of air passages arranged substantially parallel to said vehicle floor, an enclosing structure for said heating element supporting the same from the vehicle floor, an air propeller housed by said enclosing structure and situated below an opening in said vehicle floor to communicate with one end of each of said air passages, and an air conduit connecting the opposite end of each of said air passages with the interior of said vehicle body through a different opening in said vehicle floor, the said air propeller being adapted to withdraw air from the vehicle body interior through one of said floor openings, to cause the withdrawn air to travel through the air passages of said heating element, and to return the withdrawn and heated air to the interior of said vehicle body through the other of said floor openings.

In witness whereof I have hereunto set my hand this 13th day of February, 1929.

VERNON J. BUTTERFIELD.